`US006540461B1`

(12) United States Patent
Hawang

(10) Patent No.: US 6,540,461 B1
(45) Date of Patent: Apr. 1, 2003

(54) RETAINING MEMBER

(75) Inventor: James Hawang, Taipei (TW)

(73) Assignee: Kenmark Industrial Co., Ltd., Taipei (TW)

( * ) Notice: Subject to any disclaimer, the term of this patent is extended or adjusted under 35 U.S.C. 154(b) by 0 days.

(21) Appl. No.: 09/973,925

(22) Filed: Oct. 11, 2001

(51) Int. Cl.$^7$ .............................................. F16B 13/06
(52) U.S. Cl. ............................ 411/48; 411/41; 411/46; 411/60.1
(58) Field of Search ............................. 411/41, 45, 46, 411/48, 60.1

(56) References Cited

U.S. PATENT DOCUMENTS

| | | | | |
|---|---|---|---|---|
| 5,211,519 A | * | 5/1993 | Saito ........................... | 411/45 |
| 5,375,954 A | * | 12/1994 | Eguchi ........................ | 411/48 |
| 5,641,255 A | * | 6/1997 | Tanaka ...................... | 411/45 X |
| 5,902,083 A | * | 5/1999 | Hwang ........................ | 411/48 |
| 6,045,309 A | * | 4/2000 | Levey ......................... | 411/45 |

* cited by examiner

Primary Examiner—Neill Wilson
(74) Attorney, Agent, or Firm—Bacon & Thomas, PLLC

(57) ABSTRACT

A retaining member structure. The structure includes a retaining rod member and a joint clamping member used to retain two object members. The joint clamping member extends between the jointed surfaces of two object members and the upper thereof has receiving slots, and the lower thereof has resilient clamping plates, and the center thereof has a through round hole which is provided for the retaining rod member to extend into, to make a retaining rod extend outside the resilient retaining plate and to further push the plate open to push against the inside of the inner insert hole of an object member, to assemble the retaining member engaged by the retaining rod member and the joint clamping member for fastening two object members. The retaining rod member and the joint clamping member can be separated to withdraw from two object members.

3 Claims, 7 Drawing Sheets

RETAINING MEMBER

BACKGROUND OF THE INVENTION

1) Field of the Invention

The present invention of a retaining member is a retaining structure using the mutual retaining between a retaining rod member and a joint clamping member to retain two object members; the said retaining member has a retaining rod member and a joint clamping member; the retaining rod member and the joint clamping member are mutually retained by the method of pressing and rotating to further joint two object members; when trying to separate two object members, the retaining rod member is rotated upwards to separate from the joint clamping member, at the mean time, the retaining rod member and the joint clamping member withdraw from two object members so as to separate two object members; it is very convenient for assembling and disassembling two object members and won't damage the structures of two object members to be jointed.

2) Description of the Prior Art

The volumes of some object members become very big after being jointed transversely or vertically; it is troublesome to move object of big volume; big volume and heavy weight inconvenience the mover also; if the object members can be dismounted to the original volumes before assembly, moving will be easier; after being moved to the destination, the object members will be assembled again for reducing the mover's trouble; however, the disassembly of the object members depends on the fixed method adopted for assembling the object members; if the object members are unable to be disassembled, then the entire big volume has to be moved.

The method for jointing object members generally uses an iron nail or a steel nail for fixedly and tightly nailing two object members together; however, once being nailed by an iron nail or a steel nail, the object members can't be separated again; if they are, holes will be left on the object members; repetitive nailing might cause cracks in the object members and make the object members unstable in application; if the nailing is pointed at a new location in order to avoid the original holes, more holes will be left on the object members and that makes the object members look very unpleasant.

Some of the objects are jointed by gluing; however, before jointing, the glue is spread on the jointing surfaces for getting dry first, then the object members are glued together; that is very time consuming; once the object members are glued together, they can't be dismounted anymore because that will damage the glued surfaces and further destroy the object members; therefore, the gluing method can be applied to the object members for only one time but not for achieving the effect of multiple applications.

Still some object members are fixedly locked by screws for assembling; although screws have the function of being dismounted and repetitive locking, the fit between screws might be tight for the first time, but it gradually gets loosening after the second time and fails to tightly lock the object members; if the object members are locked at different locations, the screwed holes left at the original locations influence the appearance of the object members; the new location for locking is subject to offset or incline and fails to tightly lock the object members.

Many assembling object members available on the market require consumers to do the assembly themselves (DIY); the elements for the assembles use screws to lock or the wood plugs to insert for jointing; however, once the object members have been formed by these assembling methods, they are hard to be dismounted; when it is necessary to move the object members, the entire big volume is actually very difficult and very inconvenient for moving; if the object members are forced to dismount by loosening the screws and the wood plugs, later when trying to reassemble the object members, the screws and the wood plugs will be locked in again, the loosening and unstable situations might happen and that shortens the useful life of the assembled object members.

Due to the shortcomings of the application of the jointing tools, the abovementioned methods for jointing the object members cause the object members hard to be repetitively dismounted or assembled for use as well as a lot of troubles and inconvenience for moving; that really needs to be improved.

The inventor of the present invention, addressed the drawbacks of the conventional methods for jointing the object members, decided to improve by providing a more practical jointing members for assembling the object members, based on the rich experience obtained from engaging in the design, the manufacturing, the sale of the related products for many years, deliberately researched, improved and invented, after many repetitive experiments, tests and trials, finally and successfully culminated in the present invention, a jointing structure using the method of retaining and assembling to joint two object members and also to dismount them for reassembling, possessing the efficiency of repetitive and multiple application in a simple and convenient assembly adaptable for those DIY self-assembling members.

SUMMARY OF THE INVENTION

The retaining member of the present invention comprises a retaining rod member and a joint clamping member; the lower aspect of the said joint clamping member is disposed with several resilient retaining plate with a round hole in the center; the outer rim in the upper aspect of the round hole is circularly disposed with several inclined locating blocks; the round hole of the joint clamping member is provided for the retaining rod member to extend into; the retaining rod at the lower end of the retaining rod member outwardly pushes the resilient retaining plate open; the lower rim of the annular cover at the upper end is disposed with a downward position limit retaining plate; the said retaining plate retains into the locating block in the upper aspect of the round hole, thereby the retaining rod member and the joint clamping member retain and joint each other to further joint the object members; the assembling procedure is simple, convenient and does not require assembly tools; rotating the retaining rod member makes the retaining rod member withdraw from the round hole of the joint clamping to separate the retaining rod member and the joint clamping member as well as the jointed object members; the retaining member comprised by the retaining rod member and the joint clamping member has the function of fixedly retaining and jointing as well as the efficiency of disconnecting and that makes the assembled object members dismountable and able to be assembled again.

The primary objective of the present invention is to use the retaining of pressing and rotating between the retaining rod member and the joint clamping member to joint two object members without using other tools; when the retaining rod member is taken out from the joint clamping member, the jointed object members are separated; it has the efficiency of repetitive assembly and application; it is very convenient for assembling the board bodies.

The secondary objective of the present invention is to dispose several convex retaining points on the retaining rod of the retaining rod member; therefore, when the retaining rod extends into the round holes of the joint clamping member, the convex retaining point in the lower aspect of the retaining rod pushes and retains the lower end of the resilient retaining plating to make the retaining rod member, under the stopping and limiting of the resilient retaining plate, unable to withdraw from the joint clamping member temporarily and that increases the firmly jointing force of the retaining.

Another objective of the present invention is that when trying to retain the retaining member, it is only necessary to depress and insert the retaining rod member downward into the joint clamping member, thereby the retaining rod member is jointed in the joint clamping member.

Yet another objective of the present invention is that when trying to separate the jointed retaining member, it is only necessary to rotate the retaining rod member to make the position limit retaining plate of the retaining rod member displace from the inclined bottom of the locating block to the inclined top end to make the retaining rod withdraw from the resilient retaining plate, thereby the resilient retaining plate has enough space to shrink a little bit and allows the retaining rod member to withdraw from the joint clamping member so as to separate the retaining member.

Still another objective of the present invention is that the assembling method of the retaining member is simple and easy; the pressing and retaining method alone can assemble the retaining rod member and the joint clamping member; it complies with the important requirement for a DIY product of being a simple assembling structure, convenient for assembling and requiring no assembling tools; thereby, the assembled objects has the efficiency of being dismountable and reassembled again, so that the volume of the jointed object members is reduced to convenience the moving; when trying to reassemble, the retaining rod member and the joint clamping member are again retained so the structure of the object members are not damaged, the integrity of the object members is reserved and the useful life of a DIY product is increased.

In order to enable a further understanding of the structure, the device and the application of the present invention, the brief description of the drawings below is followed by the detailed description of the preferred embodiment.

DETAILED DESCRIPTION OF THE PREFERRED EMBODIMENTS

Figure 1:
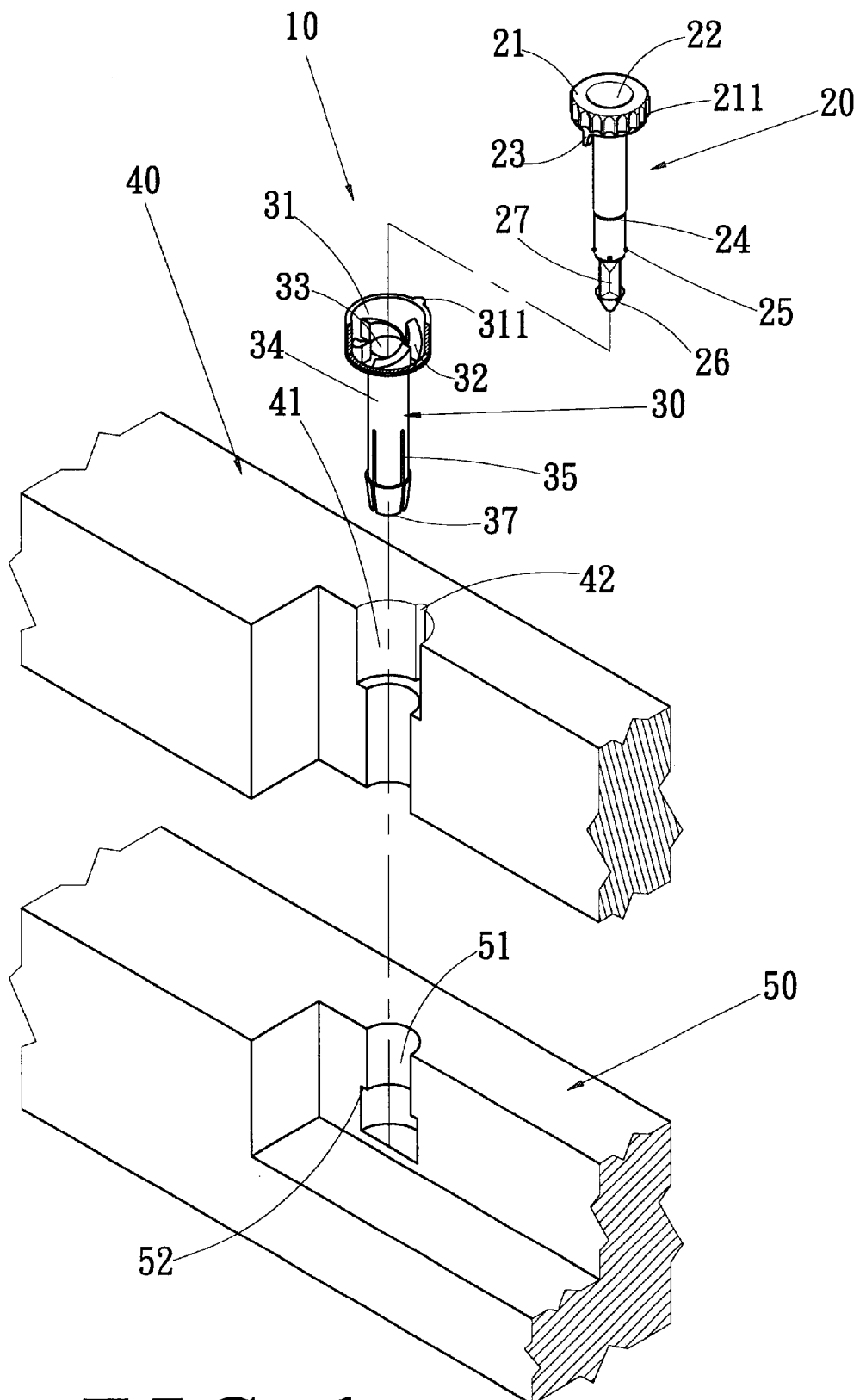
FIG. 1 is an exploded drawing of the structure of the retaining member of the present invention.
Figure 5:
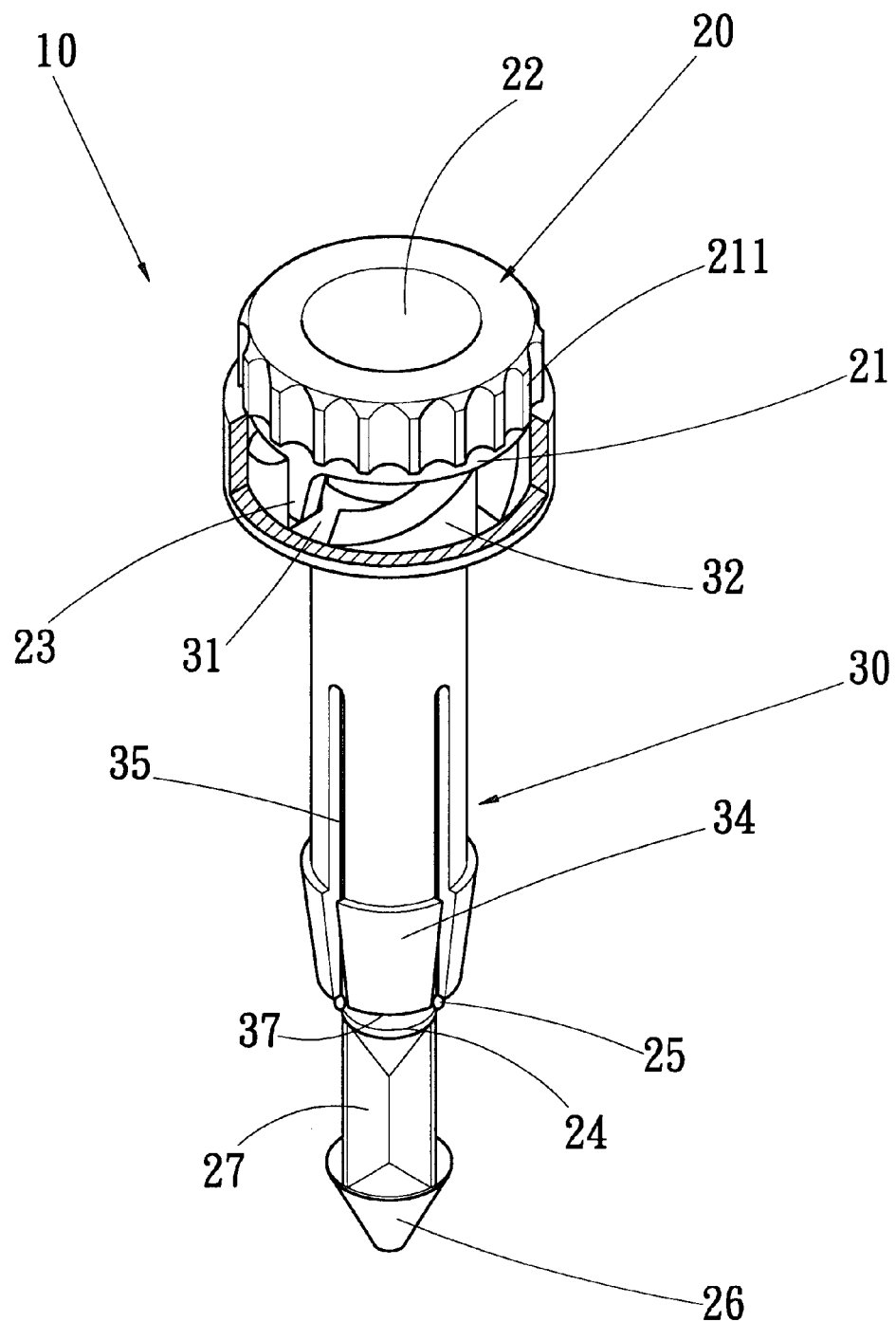
FIG. 5 is a schematic drawing of the retaining state of the retaining rod member and the joint clamping member of the present invention.

Referring to FIG. 1, a retaining member (10) of the present invention mainly comprises a retaining rod member (20) and a joint clamping member (30); the said retaining rod member (20) extends into the joint clamping member (30) to achieve the effect of retaining and jointing, wherein the retaining rod member (20) is in the form of a long rod with a annular cover (21) at the upper end; a rotating slot hole (22) is disposed in the tipper aspect of the annular cover (21) and a position limit retaining plate (33) is oppositely disposed on the lower rim side; a retaining rod (24) is disposed at the center in the lower aspect of the annular cover (21); several convex retaining points (25) are disposed at the proper locations on the retaining rod (24); an extending rod (26) with a smaller diameter extends at the lower end thereof; several inner concave slots (27) are disposed on the extending rod (26), referring also to FIG. 5.

Figure 1A:
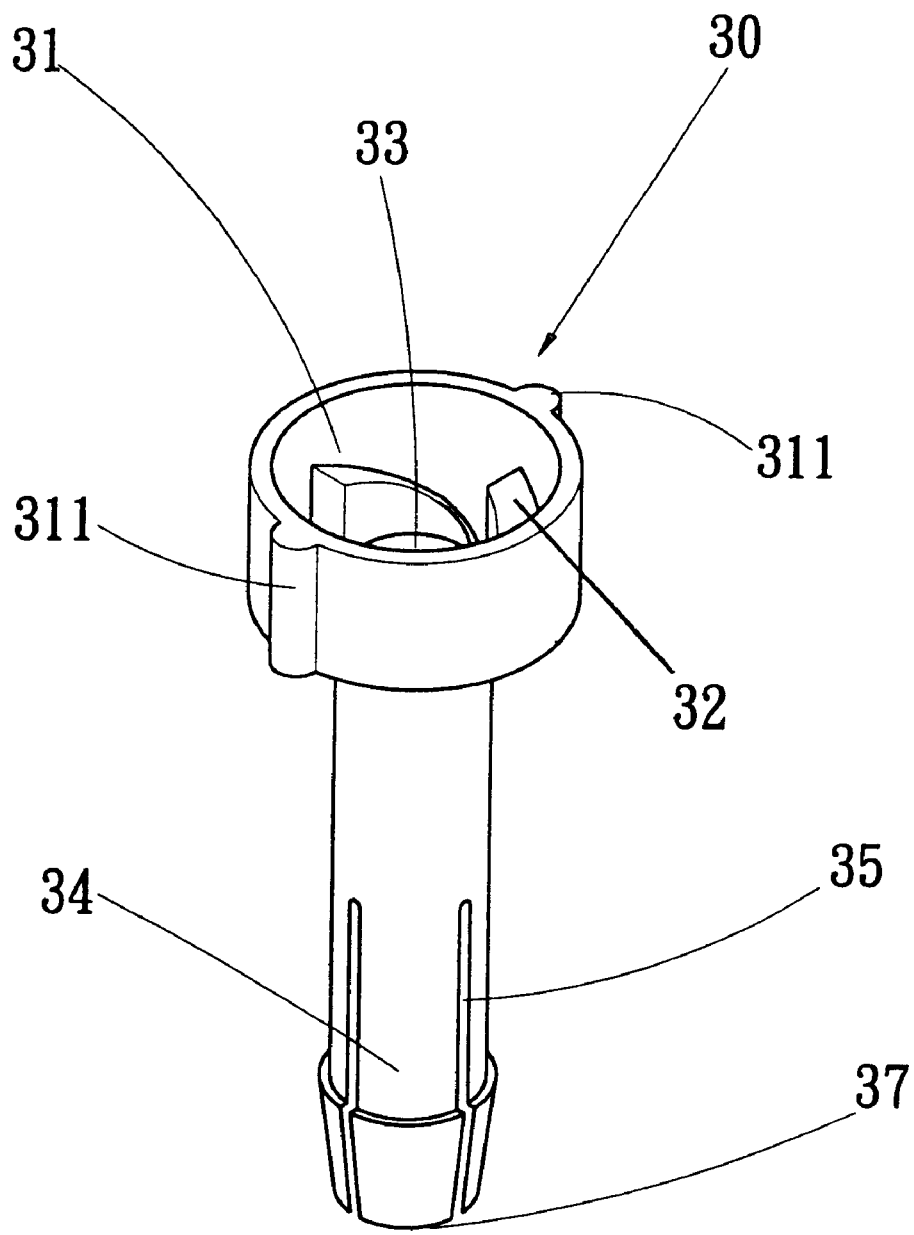
FIG. 1A is a schematic drawing of the external configuration of the joint clamping member of the present invention.
Figure 6:
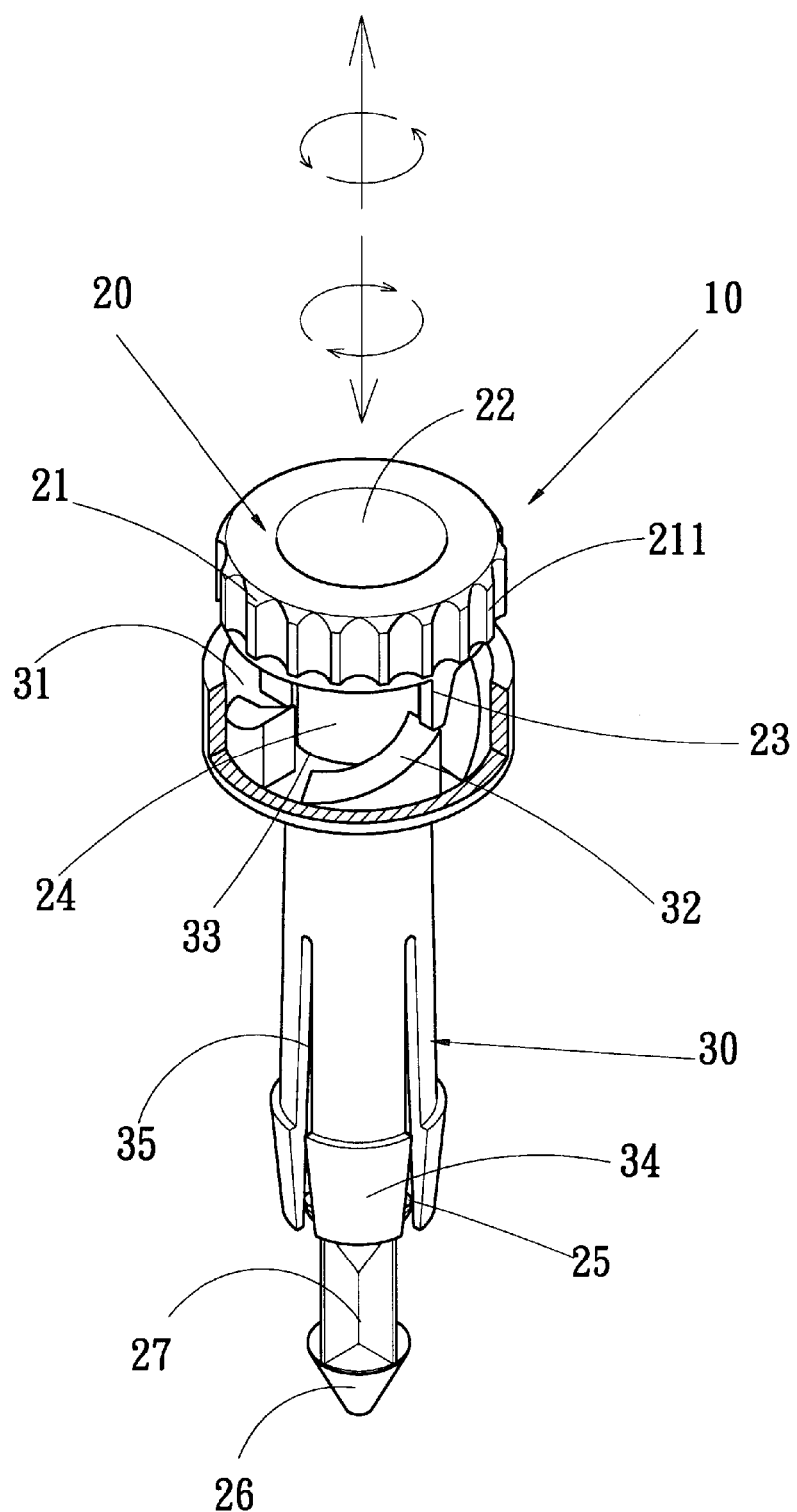
FIG. 6 is a schematic drawing of the separating method of the retaining rod member and the joint clamping member of the present invention.

The joint clamping member (30) is in the form of a tube with a receiving slot (31) at the upper end, referring to FIGS. 1 and 1A; several inclined locating blocks (32) are disposed inside the said receiving slot (31); at the center among all the locating blocks (32), a through round hole (33) is disposed downwards; several resilient retaining plates (34) are disposed outside the round hole (33); several retracting slot channels (35) are formed between the resilient retaining plates (34), referring also to FIG. 6.

Figure 2:
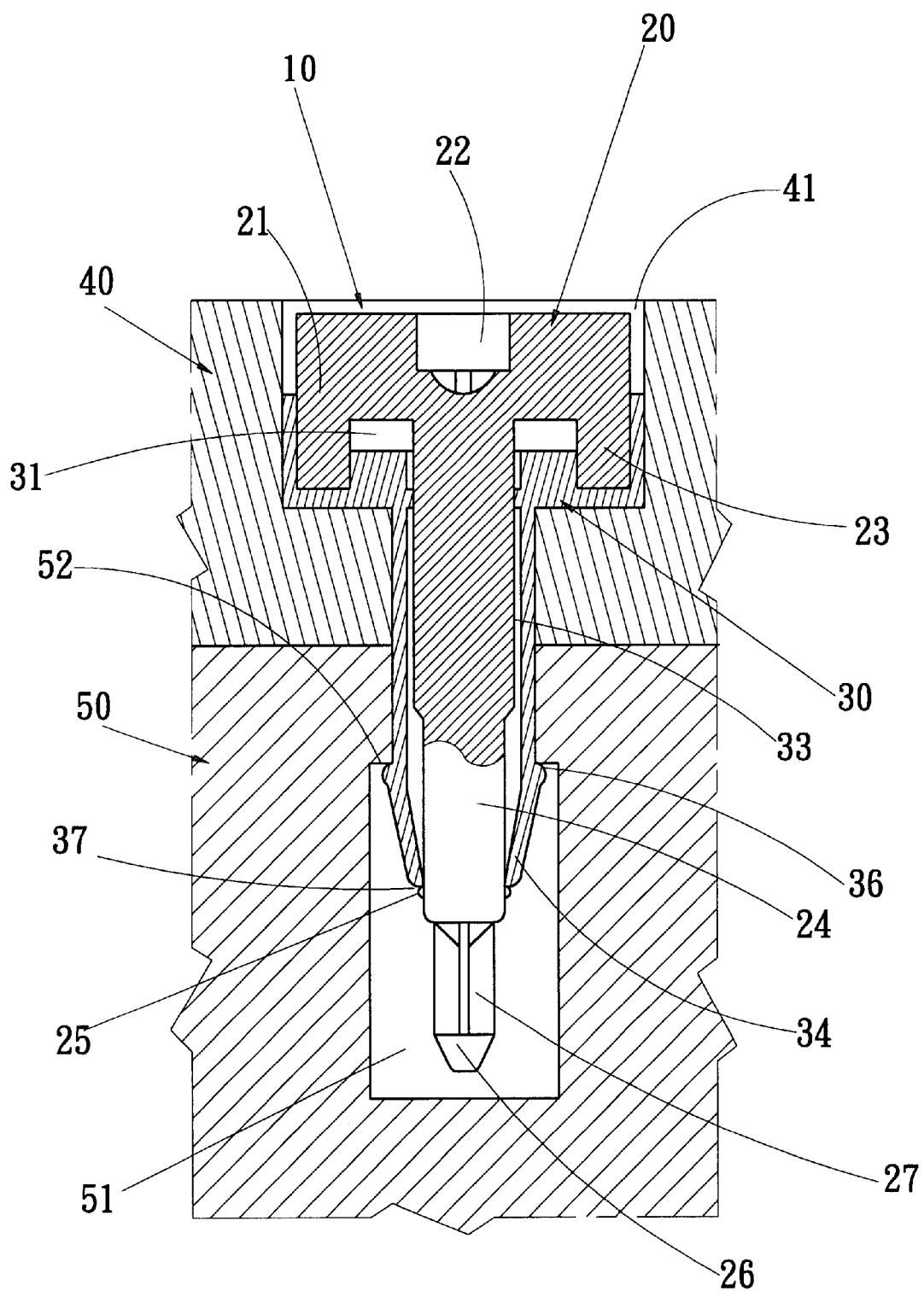
FIG. 2 is a cross-sectional drawing of the retaining state of the retaining member of the present invention.
Figure 3:
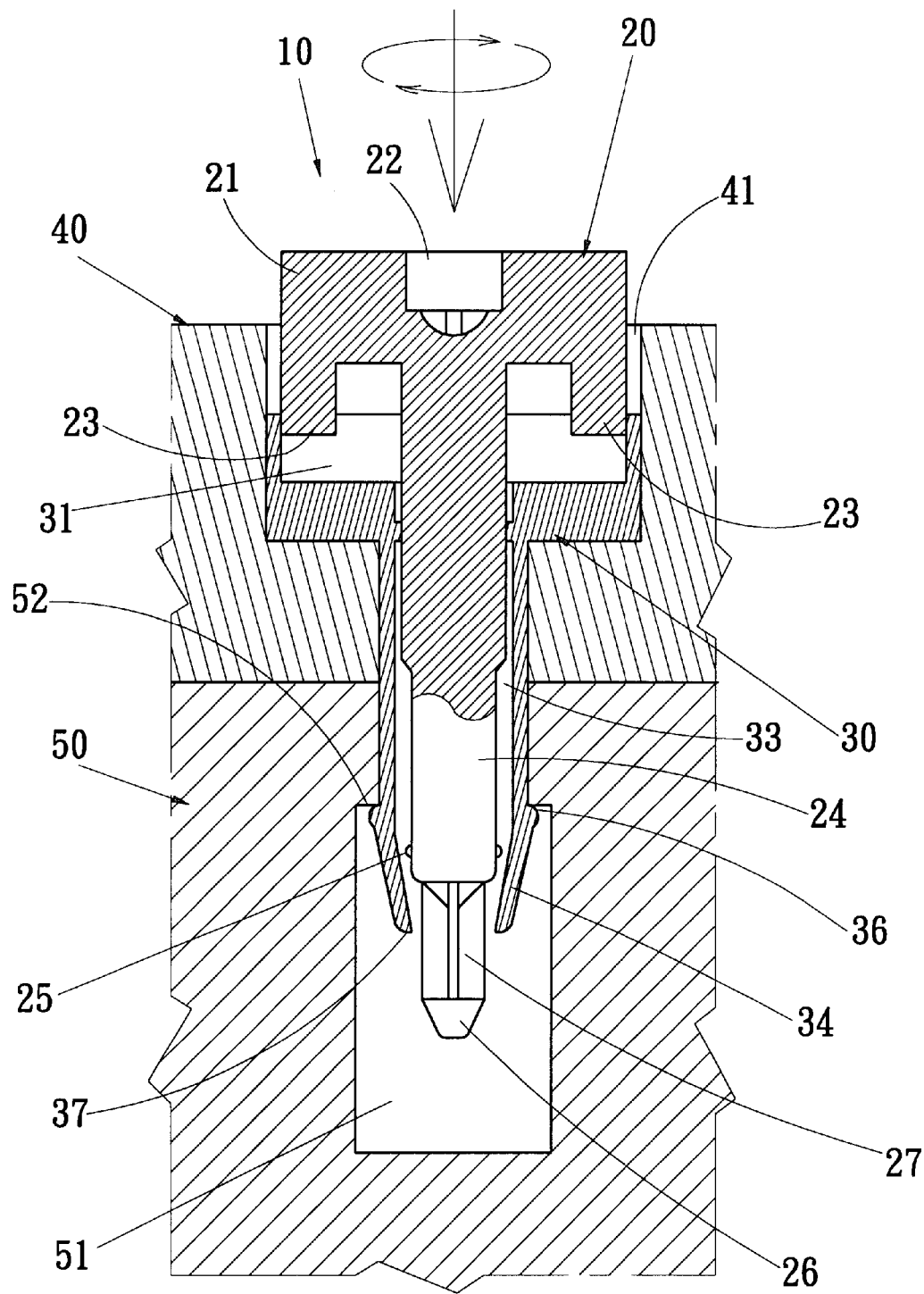
FIG. 3 is a cross-sectional drawing of the action state of the retaining member of the present invention.

Referring to FIG. 1, the exploded drawing of the assembling method of the members of the present invention, first, the joint clamping member (30) of the retaining members (10) extends through the sink hole (41) of the first object member (40) to make the resilient retaining plate (34) in the lower aspect of the joint clamping member (30) extend into the inner insert hole (51) of the second object member (50), then the retaining rod member (20) is depressed into the joint clamping member (30), as shown in FIG. 2; at the same time, the annular cover (21) of the retaining rod member (20) is rotated to make the retaining rod (24) of the retaining rod member (20) extend into the round hole (33) of the joint clamping member (30); the annular cover (21) and the position limit retaining plate (23) in the upper aspect of the retaining rod (24) slide into the receiving slot (31) in the upper aspect of the round hole (33); the retaining rod (24) pushes the resilient retaining plate (34) open outside the round hole (33), thereby the push shoulder portion (36) of the resilient retaining plate (34) pushes against the inner step shoulder (52) of the inner insert hole (51) of the second object member (50), as shown in FIG. 3; the convex retaining point (25) on the retaining rod (24) just pushes against the bottom portions (37) of the resilient retaining plate (34); therefore, the retaining rod member (20) and the joint clamping member (30) joint the first and the second object members (40, 50) together.

Figure 4:
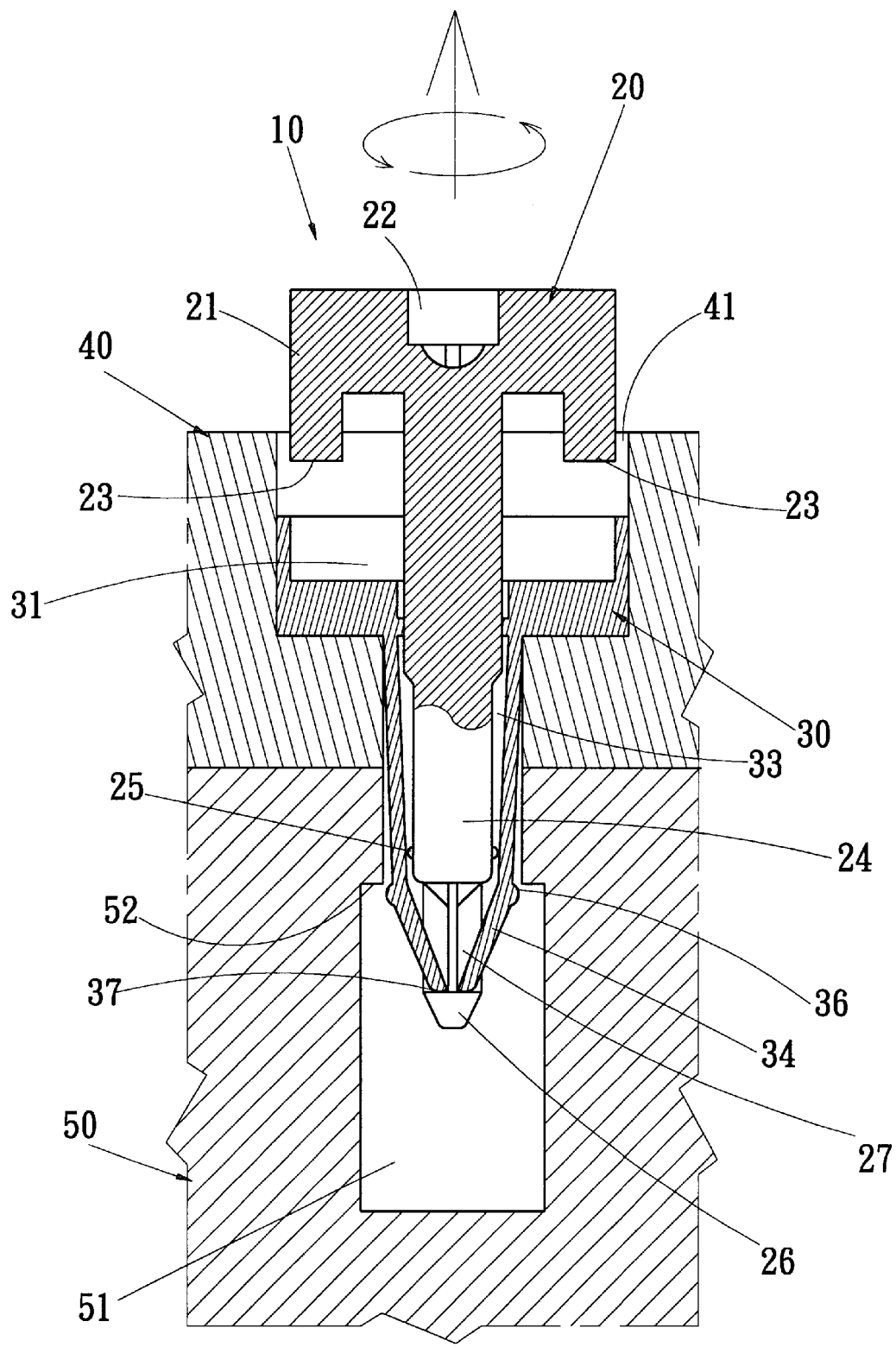
FIG. 4 is a cross-sectional drawing of the separating action state of the retaining member of the present invention.

When trying to separate the retaining member (10), as shown in FIG. 4, a tool is extended into the rotating slot hole (22) on the retaining rod member (20) (the locking method inside of the rotating slot hole (22) can be of a cross slot, a line slot, an inner hexagon shape and an outer hexagon rod) to rotate and move the retaining rod member (20) upwards thereby to make the retaining rod (24) at the lower end of the retaining rod member (20) and the convex retaining point (25) retract back into the round hole (33); the retaining rod (24) rotating and moving upwards makes the extending rod (26) raise upwards to the area of the resilient retaining plate (34), thereby the pushed resilience of the resilient retaining plate (34) retracts to make the bottom portion (37) of the resilient retaining plate (34) extend in the inner concave slot (27) of the extending rod (26); when the retaining rod member (20) moves upwards, the joint clamping member (30) is pulled to move upwards as well to make the retaining rod member (20) and the joint clamping member (30) withdraw together from the first and the second object members (40, 50) so as to separate the first and the second object members (40, 50); later, they can be reassembled.

Referring to FIG. 5, when the retaining rod member (20) and the joint clamping member (30) are inserted for jointing, the position limit retaining plate (23) in the lower aspect of the annular cover (21) at the tipper end of the retaining rod member (20) just situates at the lowest location area of the locating block (32) of the receiving slot (31); the retaining rod (24) in the lower aspect of the retaining rod member (20) presses against the bottom portion (37) of the resilient retaining plate (34) by means of the convex retaining point (25), thereby the retaining rod member (20) and the joint clamping member (30) are jointed.

When trying to separate the retaining member (10), first the retaining rod member (20) is rotated to move upwards to make the position limit retaining plate (23) in the lower aspect of the annular cover (21) to move upwards along the inclined degree of the locating block (32) of the joint clamping member (30), as shown in FIG. 6; the convex retaining point (25) on the retaining rod (24) is rotated into the retracting slot channel (35) between the resilient retaining plates (34) to make the retaining rod member (20) withdraw from the joint clamping member (30) so as to separate the retaining member (10) and to take out the joint clamping member (30) from the first and the second object members (40, 50), as shown in FIG. 1; thus to separate the first and the second object members (40, 50).

Referring to FIG. 1, on the outer lateral wall surface of the receiving slot (31) of the joint clamping member (30) of the present invention, at least more than one convex rods (311) are disposed; a locating slot (42) is disposed on the annular wall surface of the sink hole (41) of the first object member (40), opposite the said convex rod (311); when the joint clamping member (30) inserts into the sink hole (41), the convex rod (311) of the joint clamping member (30) inserts into the locating slot (42) of the sink hole (41); the retaining and positioning of the convex rod (311) and the locating slot (42) prevent the joint clamping member (30) from rotating or swinging inside the sink hole (41), thereby achieve the retaining and positioning effect of the joint clamping member (30).

In addition, referring to FIG. 5, several axially convex ribs (211) are disposed on the outer rim of the annular cover (21) at the upper end of the retaining rod member (20); when trying to open the retaining member (10), the convex ribs (211) are used as an area of application, the retaining rod member (20) is rotated to make the position limit retaining plate (23) in the lower aspect of the annular cover (21) displace along the inclined degree of the locating block (32) of the joint clamping member (30), as shown in FIG. 6, and also withdraw the retaining rod member (20) from the joint clamping member (30) thus separate the retaining member (10).

In summation of the foregoing sections, the retaining member of the present invention uses the mutual retaining and jointing between a retaining rod member and a joint clamping member to fixedly joint two object members; the assembly is convenient, simple, easy and saves the assembling time; in addition, that the retaining rod member of the retained retaining member withdraws from the joint clamping member further separates the retaining member and two jointed object members; the retaining member has the function of repetitive application, completely complies with the requirements for a new patent application and is submitted hereby to the patent bureau for review and the granting of the commensurate patent rights.

What is claimed is:

1. A retaining member adapted for securing first and second object members, the retaining member comprising:

a clamping member comprising an upper portion and a lower portion, the upper portion having a larger diameter than the lower portion, a receiving slot extending through the longitudinal length of the clamping member, inclined locating blocks positioned on the upper portion to surround the receiving slot, the lower portion comprises a plurality of resilient retaining plates positioned around the receiving slot and separated by retracting slot channels, the lower portion further comprises shoulder portions having a diameter larger than that of the lower portion and bottom portions forming a diameter smaller than that of the receiving slot;

a retaining rod member comprising an annular cover having a position limit retaining plate disposed on a lower rim of the annular cover, a retaining rod extending from the annular cover, an extending rod having a smaller diameter than that of the retaining rod, convex retaining points concentrically positioned on the retaining rod; and the retaining rod extends into the receiving slot of the clamping member and pushes the resilient retaining plates apart so that the retaining member assembled by joining the joint clamping member and the retaining rod member is secured together after the position limit retaining plate interlocks the retaining rod member with at least one of the inclined locating blocks of the joint clamping member.

2. The retaining member as claimed in claim 1, wherein when the retaining rod extends outside the resilient retaining plates of the joint clamping member, the convex retaining points on the retaining rod presses against bottom portions of the resilient retaining plates to further resist separation between the retaining rod member and the joint clamping member.

3. The retaining member as claimed in claim 1, wherein the annular cover of the retaining rod member comprises convex ribs positioned on an outer rim thereof, such that the retaining rod member can be conveniently gripped to rotate the retaining rod member and separate the retaining rod member from the joint clamping member.

* * * * *